United States Patent [19]

Miller

[11] Patent Number: 4,644,129

[45] Date of Patent: Feb. 17, 1987

[54] APPARATUS AND METHOD FOR EDGE WELDING SHEET METAL

[75] Inventor: Jule A. Miller, Derby, Conn.

[73] Assignee: Avco Corporation, Stratford, Conn.

[21] Appl. No.: 801,421

[22] Filed: Nov. 25, 1985

[51] Int. Cl.$^4$ .............................................. B23K 26/00
[52] U.S. Cl. ...................... 219/121 LC; 219/121 LD; 219/121 LS; 219/159
[58] Field of Search ................... 219/121 LS, 121 LT, 219/121 LC, 121 LD, 121 EC, 121 ED, 121 LP, 121 LR, 121 LQ, 158, 159, 137 R, 161

[56] References Cited

FOREIGN PATENT DOCUMENTS

| | | | |
|---|---|---|---|
| 0116356 | 9/1979 | Japan | 219/121 LD |
| 0036088 | 2/1982 | Japan | 219/121 LC |
| 0047083 | 3/1984 | Japan | 219/121 LD |

*Primary Examiner*—C. L. Albritton
*Attorney, Agent, or Firm*—Ralph D. Gelling

[57] ABSTRACT

A laser welding apparatus and process is provided for edge welding sheets of metal to one another. The laser welding apparatus includes aligners to advance the edges to be welded into the laser beam. The apparatus includes first and second laser welders. The first laser welder is operative to eliminate the edge discontinuities and to effect an initial attachment of the edges to one another. The second laser welder provides a larger and stronger weld bead. The process includes first aligning the edges, second removing discontinuities therefrom and third laser welding the edges. The discontinuities preferably are removed by a laser apparatus with a rotating lens.

8 Claims, 7 Drawing Figures

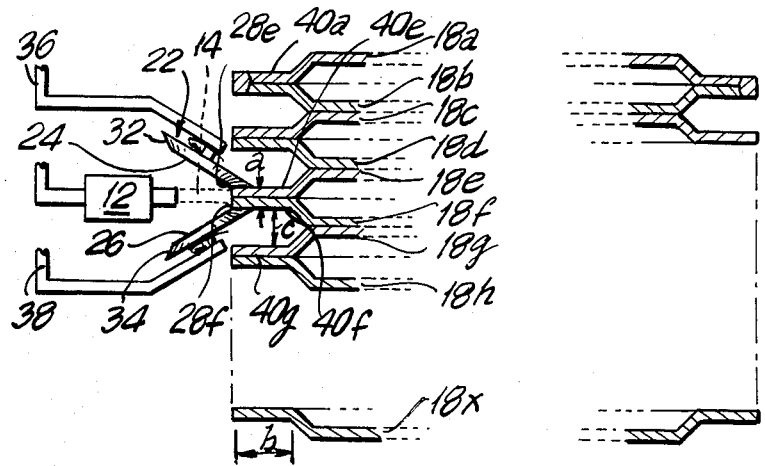
FIG.2
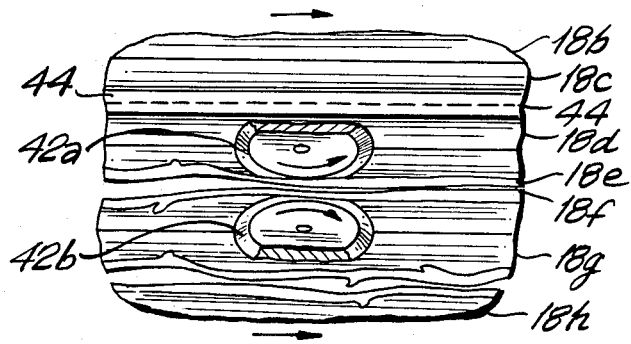
FIG.4
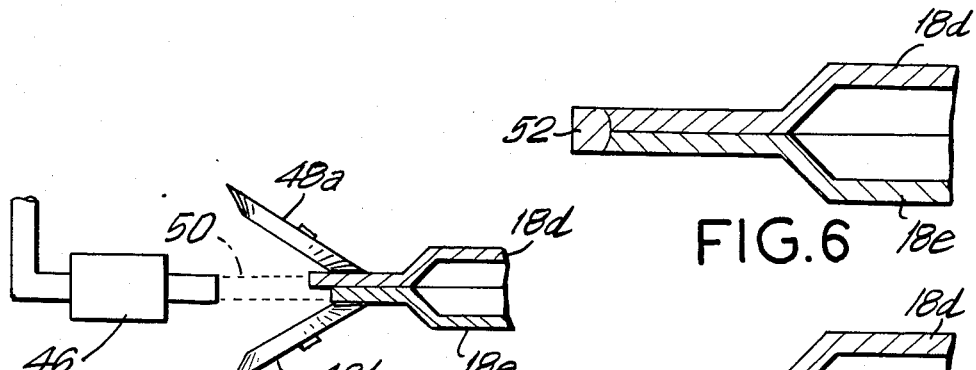
FIG.5
FIG.6
FIG.7

APPARATUS AND METHOD FOR EDGE WELDING SHEET METAL

BACKGROUND OF THE INVENTION

Some gas turbine engines employ heat exchangers to elevate the temperature of the compressed air directed to the combustor and turbine sections of the engine. This heat for the incoming compressed air is provided by the hot exhaust gases that have already performed work by rotating the various arrays of turbine blades in the engine.

The heat exchange typically is carried out by passing the hot exhaust gases and the cooler compressed air on opposite sides of a thin sheet of metal. In such gas turbine engines, the heat exchanger can include a large number of such plates mounted in substantially face-to-face contact with one another. The plates are provided with undulations extending therethrough to define arrays of channels through which the exhaust gases and compressed air may flow. One desirable heat exchanger for a gas turbine engine is shown in U.S Pat. No. 4,431,050 which issued to John J. Martin on Feb. 14, 1984, and is assigned to the assignee of the subject invention. The heat exchanger shown in U.S. Pat. No. 4,431,050 includes a large number of very thin substantially identical annular plates which are stamped to include arrays of corrugations. The corrugations are formed to define the respective flow channels for heated exhaust gases or cooler compressed air on alternate sides of each plate shown in U.S. Pat. No. 4,431,050.

To properly channel the exhaust gases and the compressed air through the above described heat exchangers, it is necessary to provide secure and continuous attachments between selected plates. In annular heat exchangers, such as the heat exchanger shown in U. S. Pat. No. 4,431,050, these continuous and secure attachments must extend around both the inside diameter and the outside diameter of alternate adjacent plates to define attached pairs of plates. Although each such plate may be relatively small, (e.g. 12 inches to 28 inches), the plates are very thin (e.g. 0.005 to 0.010 inches) and will be stacked to define an axial length that may be at least as great as its diameter. In view of these geometric characteristics, there may be approximately one half mile of continuous attachments extending around the outer circumference of a stacked-plate heat exchanger of the type shown in U.S. Pat. No. 4,431,050. Similarly, this same heat exchanger may require approximately one quarter mile of attachments around the inside diameter.

The adjacent plates of the stacked-plate heat exchangers, such as the heat exchanger shown in U.S. Pat. No. 4,431,051, generally are secured to one another by welding. Attempts have been made to manufacture such devices by electron beam welding. In these attempts, individual strands of copper wire were wrapped circumferentially around the plates adjacent to the desired weld seam. An array of these plates then was placed in a vacuum chamber, and an electron beam was directed at the plate edges. The wire maintained contact between the plates during welding but was not welded to them. Although this technique worked well in experiments, it was totally unacceptable for production scale manufacture of heat exchangers. Specifically, the circumferential wrapping of wires was extremely costly, labor intensive and time consuming. Furthermore, the vacuum chamber also was costly, and attempts to rapidly feed arrays of heat exchangers into the vacuum chamber for welding would be unworkable.

In view of the problems encountered in electron beam welding of stacked-plate heat exchangers, virtually all such heat exchangers have been manufactured by resistance welding. Although the products produced by resistance welding have been acceptable, the manufacturing process has been slow and there have been several noticeable drawbacks. More particularly, the resistance welders utilize a pair of spaced apart rotating discs which function to both press the adjacent thin plates of the heat exchanger together and to carry an electrical current for fusing the two plates to one another. The two functions of these electrode discs tend to be irreconcilable. Specifically, the discs should be strong and highly abrasion resistant for holding the two plates against one another and for rotating relative to these plates. Ideally, a manganeze steel might be selected to perform this function. However, the electrodes must also carry a very high current, low voltage charge to effect the welding. Preferably a cathode copper or some similar highly conductive material would be selected to carry out this electrode function. Unfortunately, these highly conductive metals are not well suited to applying the pressure force to the plates. Consequently, it is necessary to make various compromises in selecting the electrode materials. Additionally, the weld produced by resistance welders is not readily visually observable. Consequently, the welds can only be spot checked by periodically cutting welded plates apart to ensure that the equipment is functioning properly. These spot checks are also very costly and time consuming. One resistance welder that has performed well is shown in U.S. Pat. No. 3,493,714 which issued to John J. Martin et al on Feb. 3, 1970 and is assigned to the assignee of the subject invention.

The thin sheets of metal used to form the heat exchangers also result in problems for the resistance welding apparatus. Specifically, the very thin sheets of metals used in these heat exchangers are likely to have a large number of burrs around their periphery. These burrs can interfere with the efficient resistance welding and therefore must be mechanically removed prior to welding. This separate mechanical preparation step also is time consuming, labor intensive and costly.

Laser welders have been used for various applications. Typically, the laser welder directs a tightly focused laser beam toward the joint to be welded. This laser beam causes a controlled amount of the adjoining surfaces to be melted and fused together. In developing the subject invention, tests were carried out using variations of the known laser welders. The known devices presented several significant problems when used to edge weld thin sheets of metal, as in the above described heat exchangers. Specifically, the above described sheets of metal were seldom perfectly planar. Consequently, the prior art laser welder could not be accurately directed to the actual location of the edges to be welded. Additionally, as noted above, the thin sheets of metal employed in the heat exchangers often have rough edges and burrs. When the laser beam was directed to this edge, the light comprising the laser beam would be reflected off the various irregular surfaces of the rough edge, thereby yielding an ineffective edge. Any effort to mechanically straighten the edges of these sheets and to eliminate the burrs were considered to offset the potential efficiencies of the laser welder.

In view of the above, it is an object of the subject invention to provide an efficient apparatus and process for welding the edges of two sheets of material.

It is another object of the subject invention to provide an apparatus and process for edge welding which employs a laser welder.

It is an additional object of the subject invention to provide an apparatus and process for welding the edges of very then sheets of metal to one another.

It is a further object of the subject invention to provide an apparatus and process for welding two irregular edges to one another.

Another object of the subject invention is to provide an apparatus and process for edge welding thin sheets of metal which eliminates the need to mechanically remove burrs and other edge irregularities prior to welding.

SUMMARY OF THE INVENTION

The subject invention is directed to a laser welder which is operative to direct a laser beam toward adjacent edges of two sheets of metal to fuse the two edges together and to a process for performing such a weld. To facilitate the proper alignment of the edges to be welded, the laser welder is used in proximity to alignment means which urge the sheets of material to be welded into proper alignment with the laser beam. The alignment means may be a pair of discs which roll along the sheets of metal adjacent the edges to be welded. The laser beam may be directed intermediate the two spaced apart alignment discs. Alternately, the discs may lead the laser beam slightly.

Alignment discs, as described above, may be angularly aligned relative to one another, and may each include beveled edges. The angle of the bevel and the angle of the respective discs can be selected to ensure that the beveled edges are parallel to one another at the point where the discs are closest to one another. Additionally, the minimum spacing between the beveled edges can be approximately equal to the combined thickness of the two sheets of metal to be welded. Thus, the alignment discs can urge the edges of the sheet metal into a proper position for welding.

The apparatus and process may employ a pair of laser welders. The first laser welder in the pair may be operative to remove the burrs and other edge irregularities from the sheets of metal and to perform at least an initial joining of the sheet metal edges together. This first laser welder can employ a rotating lens to effect a controlled diffusion of its laser beam. This partially diffused beam of laser light generally will not be effective in creating a strong weld between the respective sheets. However, this partly diffused laser beam generated by the first laser welder will have sufficient energy to remove the burrs and surface irregularities that otherwise would cause a reflection of a tightly-focused laser beam.

The first laser welder with the rotating lens can be employed in proximity to alignment means, such as the alignment discs described above. The alignment discs may be disposed either on opposed sides of the point on the sheets of metal impinged by the first laser beam or may be in advance of the first laser beam.

The second laser welder of the above-described pair may employ a tightly-focused laser beam to effect a more complete welding of the respective deburred and initially-joined edges. The second laser welder may be used with a second alignment means to ensure proper positioning of the edges to be welded relative to the second laser welder. This second alignment means can include a pair of discs similar to those described above. These alignment discs can be positioned in line with and on opposite sides of the second laser beam or can be slightly in advance of the second laser beam to feed the properly-aligned and trimmed edges of the sheet metal into the second laser beam.

The laser welder and the alignment means can be mounted on a support arm, the movements of which can be carefully controlled and preprogrammed. Thus the laser welder and the alignment means can be programmed to follow a particular alignment of edges to be welded. The alignment means can be employed to effect fine adjustments to the actual positioning of the sheet metal edges to ensure proper and precise alignment of the edge relative to the laser beam. In making an annular heat exchanger from a plurality of very thin metal plates, the laser welder and alignment means can be positioned in proximity to a turntable on which the stacked plates can be mounted. The stacked plates then can be rotated about their longitudinal axis and relative to the laser welder and the alignment means. In this manner, one rotation of the turntable will enable a complete and secure circumferential welding of two sheet metal edges on the annular heat exchanger. The laser welder and alignment means then can be repositioned axially to align with and enable the welding of the next pair of edges of the heat exchanger. The laser welder can effect the secure joining of both the outer and inner circumferential edges of the annular heat exchanger. As noted above, this repositioning of the welder and alignment means can be carried out through preprogrammed instructions.

A plurality of the above-described welding devices can be employed simultaneously and in cooperation with such a turntable. For example, one welding and alignment assembly can weld the inner circumferential surface of the heat exchanger while a second welding and alignment assembly welds the outer circumferential surface thereof.

The laser welder described herein enables the rapid and efficient edge-welding of the two sheet metal members. The alignment means can be manufactured from very hard materials selected to facilitate the alignment and feeding of the sheet metal members. Since these alignment means perform no actual welding or electrical current carrying functions, there are no compromises in the selection of these materials. Furthermore, the welds produced by the above-described apparatus and process can readily be inspected visually, thereby overcoming the various quality control problems that had been encountered with resistance welding techniques.

BRIEF DESCRIPTION OF THE DRAWINGS

FIG. 2 is a cross-sectional view of the apparatus as used with an annular stacked-plate heat exchanger.

FIG. 4 is a view taken along line 4—4 in FIG. 3.

FIG. 5 is a cross-sectional view taken along line 5—5 in FIG. 3.

FIG. 6 is a cross-sectional view of two heat exchanger plates taken along line 6—6 in FIG. 3.

FIG. 7 is a cross-sectional view of two heat exchanger plates taken along line 7—7 in FIG. 3.

DETAILED DESCRIPTION OF THE PREFERRED EMBODIMENTS

Figure 1:
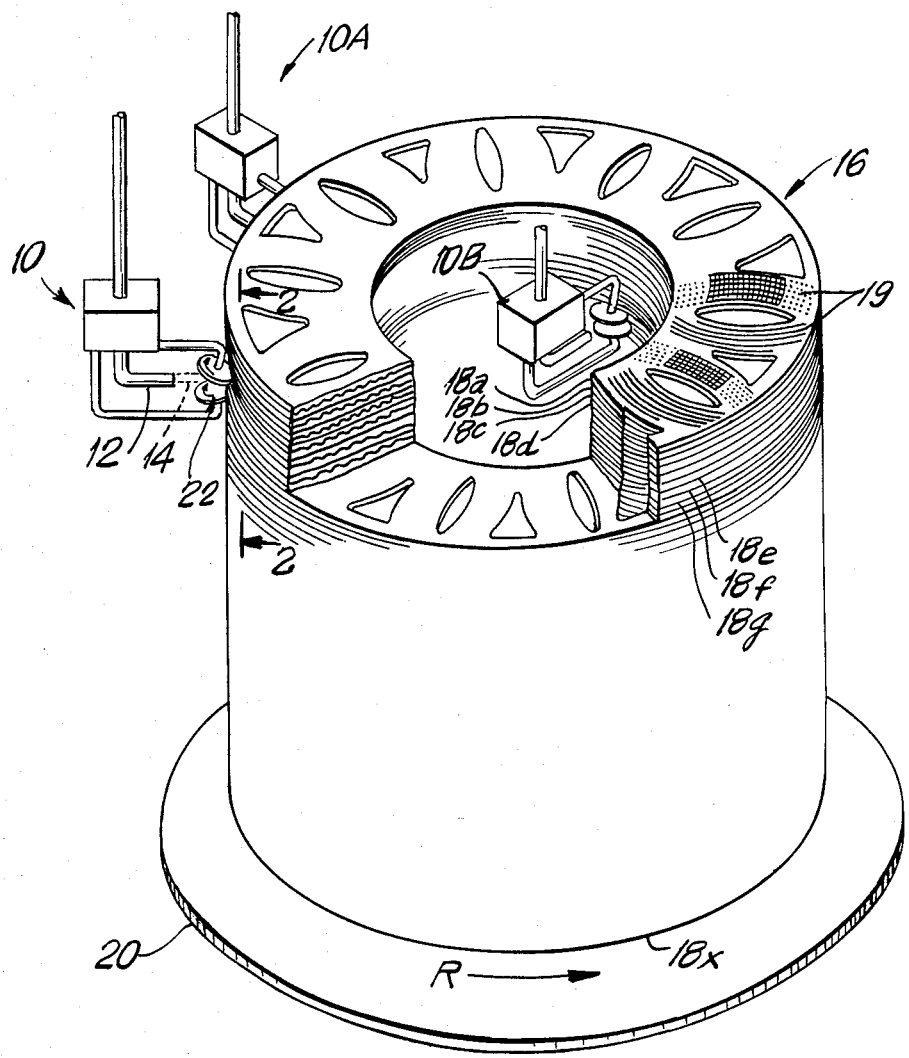
FIG. 1 is a perspective view of the apparatus of the subject invention.

The laser welding apparatus of the subject invention is illustrated schematically in FIG. 1 and identified by the numeral 10. As explained herein, a plurality of such welding apparatuses may be employed simultaneously and in cooperation with one another, such as the two additional welding apparatuses 10A and 10B in FIG. 1.

The welding apparatus 10 includes a laser welder 12 which is operative to direct a laser beam 14 toward a workpiece which is indicated generally by the numeral 16. The workpiece 16 is formed from a plurality of thin sheets of metal 18a-x disposed in face-to-face relationship such that the respective peripheral edges thereof are generally in register with one another. More particularly, each sheet of metal 18a-x is generally annular in configuration and has a thickness of approximately 0.008 inch. Each sheet of metal 18a-x is provided with an array of corrugations 19 which are carefully constructed to define narrow air channels when a plurality of such sheets of metal 18a-x are disposed in stacked, generally face-to-face relationship as shown in FIG. 1. The apparatus 10 described herein enables the efficient welding of the edges of adjacent sheets of metal 18a-x to one another to accurately and completely channelize the flow of air between adjacent metal plates 18a-x.

To enable the proper positioning of the workpiece 16 to the welding apparatus 12, the workpiece 16 is mounted on support 20. The support 20 is operative to rotate relative to the welding apparatus 10 so that the edges on which work is to be performed can be presented to the apparatus 10. As shown in FIG. 1, this movement of support 20 is rotational as indicated by arrow R to reflect the annular configuration of the workpiece 16. Other patterns of movements of the workpiece 16 could be carried out when workpieces of other shapes are employed. Thus after one complete rotation of support 20 and workpiece 16, the apparatus 10 can be incrementally advanced to present a new and unwelded seam to the wheels and laser beam. Alternatively, the support 20 can be movable in an axial direction. For example, the apparatus 10 may be mounted on an array of articulated arms which are programmed to carry out carefully-controlled movements relative to the workpiece.

The apparatus 10 further includes alignment means 22. As shown more clearly in FIG. 2, the alignment means 22 preferably includes a pair of rotating discs 24 and 26. The discs 24 and 26 perform the function of precisely aligning the edges 28a-x of adjacent metal plates 18a-x relative to the laser beam 14. This alignment function inherently includes certain repositioning of edges 28a-x, the sheet metal plates 18a-x, and the leveling of certain discontinuities. In view of this function, the discs 24 and 26 must be formed from a very hard material. Preferably, discs 24 and 26 are formed from a very hard steel or a very hard aluminum, either of which is preferably coated with Teflon.

In the preferred embodiment as illustrated in FIG. 2, discs 24 and 26 are angularly aligned relative to one another and relative to the axis of laser beam 14 and the respective planes of sheet metal plates 18e and 18f. Additionally, it is preferred that discs 24 and 26 are provided with beveled edges 32 and 34, respectively. The angle between discs 24 and 26 and the angle of the beveled edges 32 and 34 are selected such that at the location where discs 24 and 26 are closest to one another, the beveled edges 32 and 34 thereof are substantially parallel. Additionally, the spacing between the discs 24 and 26, at their closest location to one another, preferably is equal to substantially twice the thickness of each sheet metal plate 18a-x. Thus for sheet metal plates having a thickness of approximately 0.008 inch, the discs 24 and 26 will be spaced apart approximately 0.016 inch at their closest point, as indicated by dimension "a" in FIG. 2.

The dimensions of the discs 24 and 26 and of the members 36 and 38 to which they are mounted will be a function of the sizes of the sheet metal plates 18a-x and the spacing between adjacent pairs of welded plates. In a typical application, the discs 18a-x will include flanges 40a-x. The flanges 40a-x will have a radial dimension of approximately 0.08 inch as indicated by dimension "b" in FIG. 2. Additionally, the distance between adjacent pairs of welded flanges (40f to 40g) will be approximately 0.08 inch as indicated by dimension "c" in FIG. 2. These relatively small dimensions require equally small dimensions for discs 24 and 26 and for the supports 36 and 38 to which they are mounted. The configuration of the support members 36 and 38 in FIG. 2 is schematic only. The actual configuration will be dependent upon various design criteria, including dimensions of the workpiece 16, relative positions of the discs 24 and 26 to the laser 12, and the intended operating speeds of the apparatus.

Figure 3:
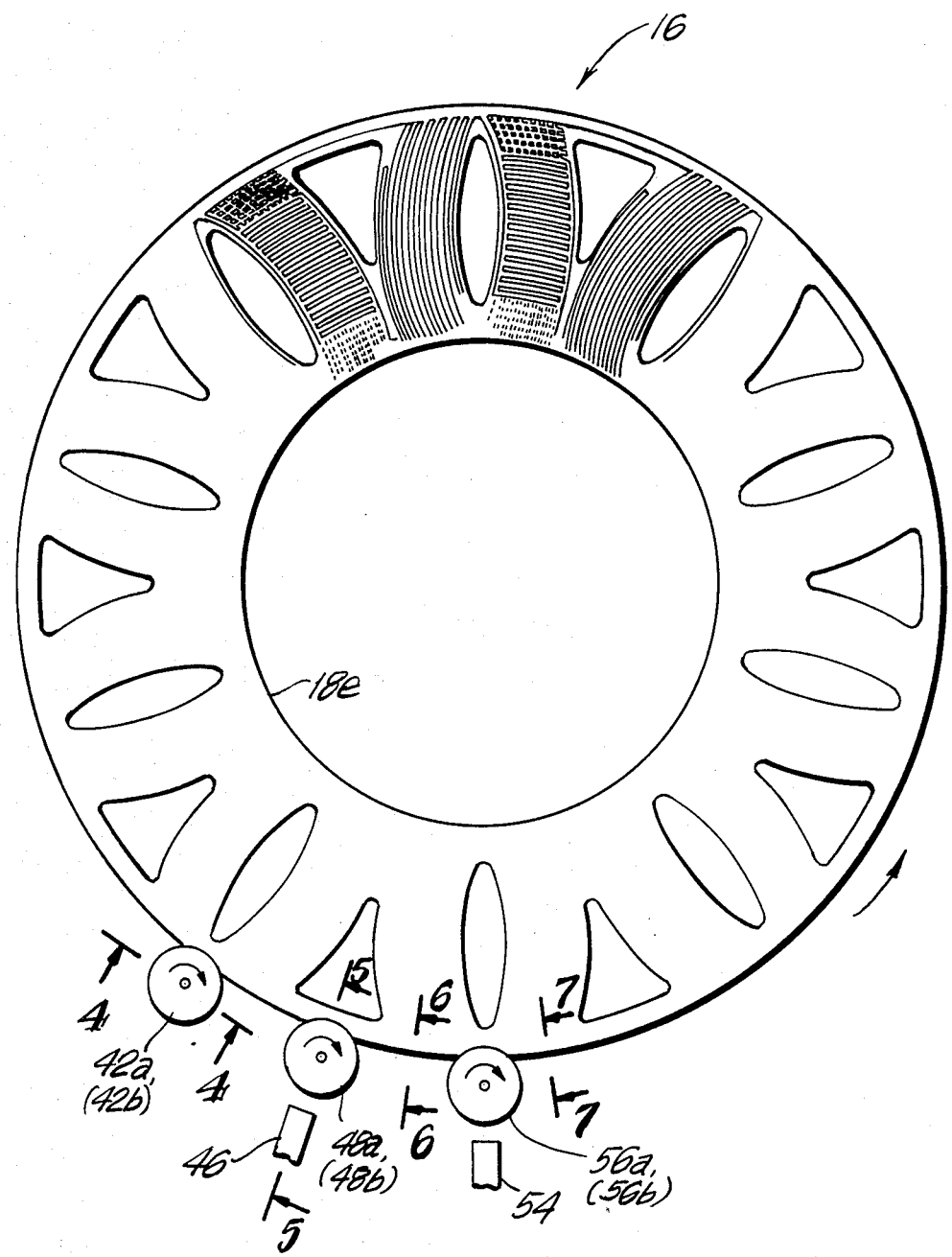
FIG. 3 is a top plan view of the apparatus used with a pair of the stacked sheet metal plates.

Turning to FIG. 3, one preferred embodiment of the invention is illustrated more clearly. The apparatus shown in FIG. 3 is used in connection with a work piece 16 formed from a plurality of substantially identical flat metallic plates 18a-x (of which plate 18e is shown) with the edges of adjacent plates being welded together around substantially the entire periphery. As noted above, the plates 18a-x are stamped formed from a sheet metal having a thickness of approximately 0.008 inch. These very thin metallic sheets invariably will develop edge irregularities and burrs through normal handling. Burrs and other such irregularities can cause problems with any welding equipment, and particularly with laser welding equipment. Specifically, as explained above, irregular edges are likely to reflect the laser beam thereby scattering the energy and resulting in an ineffective weld.

The apparatus illustrated in FIGS. 3-7 overcomes these various problems. The apparatus of FIGS. 3-7 includes a first pair of alignment wheels 42a, 42b which lead the remainder of the apparatus in contacting the edges of sheet metal plates 18e and 18f. The wheels 42a and 42b are operative to smooth out major edge irregularities in the sheet metal plates 18. This operation is shown clearly in FIG. 4. Specifically, with reference to FIG. 4, the discs 42a and 42b roll in contact with the sheet metal plates 18e and 18f to effectively level out major surface irregularities therein. In this regard, it should be noted that the metal plates 18c and 18d of the work piece 16 have already been welded, as shown in FIG. 4, to yield a smooth seam 44. On the other hand, the metal plates 18g and 18h have yet to be addressed by the discs 42a and 42b and therefore evidence significant irregularities entirely about their respective peripheries.

Adjacent to the discs 42a and 42b is laser welder 46 and alignment discs 48a and 48b as shown in FIGS. 3 and 5. The alignment discs 48a and 48b are operative to further smooth out irregularities and to ensure that the plates 18d and 18e are properly aligned relative to the laser welder 46. The function of the laser welder 46 is to eliminate the burrs and irregularities that were partly leveled by discs 42a and 42b. This is achieved by a laser beam 50 which is not tightly focused on the seam between plates 18e and 18f, but rather oscillates between edges 18e and 18f. The desired degree of dispersion of the laser beam 50 can be obtained by employing a rotating lens within the laser apparatus 46. The oscillating laser beam 50 minimizes reflection off the edge irregularities of plates 18d and 18e, and hence eliminates most such irregularities and results in an initial bond between plates 18e and 18f as indicated by location 52 in FIG. 6.

The area of fusion 52 shown in FIG. 6 may provide adequate strength for many applications. However, in other applications, such as the heat exchanger of a gas turbine engine, it will be desirable to have a stronger joint. To achieve this stronger joint, a second laser welding apparatus 54 is provided as shown in FIG. 3. The laser apparatus 54 is operative to direct a tightly focused laser beam at the area of fusion between plates 18e and 18f. To ensure proper alignment of the laser welding apparatus 54 to the seam between plates 18e and 18f a third set of alignment means 56 may be employed. The alignment means 56 may be substantially the same as the alignment discs 48a and 48b illustrated and described above. However, the alignment means 56 may be eliminated if the plates 18e and 18f are of sufficient thickness to ensure proper alignment and/or of the laser welding apparatus 54 is sufficiently close to the alignment discs 48a and 48b. The weld resulting from the apparatus 54 is identified by the numeral 58 in FIG. 7. This weld is significantly larger and stronger than the weld 52 shown in FIG. 6. The size of the weld 58 can be varied by appropriate adjustments to the level of energy of laser apparatus 54 and the speed of the plates 18e and 18f relative to the laser welding apparatus 54.

The welding techniques described above were tested by welding a plurality of pairs of six inch diameter plates formed from 0.008 inch thick in Inconel 625. One plate in each pair was provided with a pressure test fitting. The tests were carried out using 375 watt, 525 watt, and 800 watt lasers which are typically used for breadboard tooling. In the first series of tests, the plates were vertically aligned and the laser beam was directed vertically downward onto the edges to be welded. The various pairs were tested by subjecting the discs to pressure conditions comparable to those met by a heat exchanger during operation of a gas turbine engine. Specifically, the welded plates were restrained in a fixture and were tested at 1300° F. (704° C.) by pressurizing the specimen with nitrogen gas at 360 cycles per hour until failure or runout. All specimens were tested at 500 PSI maximum pressure and held between restraining plates to a maximum deflection under pressure of 0.075 inch.

A first series of trials was performed on parts with various conditions of edge mismatch up to 0.020 inches. These mismatches consisted of the normal burred corners and random distortions and dents that are likely to be encountered in production of heat exchangers. A straight laser beam directed toward the test specimen was randomly reflected by the edge mismatch resulting in poor energy coupling, a very inconsistent weld size and a humped bead profile. This condition was not successfully eliminated by increasing the energy density or altering the focal length to increase the width of the laser beam.

A second set of tests was conducted utilizing a rotating lens to produce a circular deflection of the beam which alternately directed the beam between the two plate edges. The system was tested with a 375 watt laser and a lens that rotated at 17 Hz through a 0.008 inch circular deflection. The resulting edge weld resulted in a smooth and a continuous weld bead surface in one welding pass and successfully eliminated the energy coupling problem caused by edge mismatch. However, low cycle fatigue testing of these specimens yielded values below the minimum acceptable for resistance welded plates in a heat exchanger. The failures occurred through the weld, thereby indicating that the overall weld size was insufficient to withstand the required loads. Specifically, the mean internal pressure fatigue strength in these tests was 32 psig, whereas the base line value for resistance seam welds is 215 psig.

To improve the weld and to compensate for the lower overall power density from the rotating lens and the resulting small weld size, the tests specimen was passed again in proximity to a laser welder. In these tests, the first pass used the rotating lens circular beam deflection described above to fuse the mismatched plate edges. The second welding pass used a straight, higher energy density beam to make a weld of the required penetration and cross section. The resulting welds exhibit a match-head shape that was much larger than the single pass weld, yet still retained a smooth weld surface. Four of six test specimens produced in this manner fell within the established band for resistance seam welded plates, while the remaining two test specimens failed. An examination of the specimens show that failures occurred through the weld an in each case, the failure initiated at a cold shut weld defect at the bottom of the weld. This cold shut was found on the inside edge of one plate next to the bottom of the weld puddle which collapsed between the two separate plates. It was concluded that the tooling used in the test specimens did not provide a fit-up tight enough to avoid this separation. When the second laser beam was applied to the test specimens, a larger molten weld puddle formed on the plate edges and flowed between the plates where it came in contact with the cold plate surfaces and solidified.

Additional tests were conducted utilizing a horizontal beam and horizontally aligned plates. These additional tests were conducted using the double pass weld technique described above. Since the test apparatus employed was not strong enough to ensure intimate face-to-face contact between the plate edges, the test specimens were initially laser tact welded at several locations to ensure the intimate contact of the plates approaching the laser welders. In actual practice, this intimate contact would be achieved by alignment means and the initial tack welding would not be needed. The weld produced in these tests again had a match head shape and a smooth, uniform and visually inspectable contour. The fatigue tests of the specimens yielded values in the mid to upper ranges of the band for resistance seam welds. The mode of failure was along the fusion line of the laser edge weld to the base metal or at the pressure fitting. The metallurgical evaluation of these welds showed no evidence of the cold shut condition which propogated into a weld crack. The elimination of this stress riser resulted in an improvement in the weld fatigue for the tested specimens to 230 psig.

In summary, an apparatus is provided for laser edge welding sheets of metal. The apparatus includes alignment means for urging the two edges to be welded into intimate face-to-face to contact and for ensuring alignment of the edges to the laser beam. When the welding is to be carried out on thin sheets of metal, which in production are likely to develop and exhibit edge mismatch, the apparatus will include first and second laser welders. The first laser welder eliminates the edge mismatch and effects an initial joining of the edges. This first laser welder employs a rotating lens and is used in proximity to alignment means for ensuring that the edges to be welded are properly aligned to the laser beam. A second laser welder effects a more complete fusion of the edges. A preliminary alignment means may also be employed in advance of the first laser welder to effect an initial alignment of the edge. The laser welding apparatus may be employed with an appropriate movable support which advances the plates to be edged welded relative to the laser welder. The laser welding apparatus may also be movable.

While the invention has been described relative to a preferred embodiment, it is obvious that various changes and modifications can be made without departing from the spirit and scope of the invention as defined by the claims attached hereto.

I claim:

1. An apparatus for edge welding the plates of a stacked plate heat exchanger, said apparatus comprising:
   - a first laser source in proximity to the edges to be welded and operative to direct a laser beam toward said edges, said first laser source including a rotating lens which is operative to deflect the laser beam alternately between the respective edges to be welded;
   - means for aligning the edges of the plate to the beam of the first laser source;
   - a second laser source in proximity to the edges of the plate, said second laser source being operative to direct a laser beam toward said edges; and
   - means for effecting relative movement between the plates and the first and second laser sources such that the edges of said plates are first subjected to the beam of said first laser source, whereby the first laser source eliminates discontinuities on the edges of the plates and provides an initial fusing of said edges, and whereby the second laser source is operative to provide a more complete fusing of said edges.

2. An apparatus as in claim 1 wherein the means for aligning the edges comprises at least one pair of spaced apart angularly aligned rotating discs, said discs being positioned relative to said plates such that the edges of said plates are disposed intermediate said discs at the points on said discs closest to one another.

3. An apparatus as in claim 2 wherein said at least one pair of discs comprises first and second pairs aligned generally with the first and second laser sources respectively.

4. An apparatus as in claim 3 comprising a third pair of rotating discs disposed to initially smooth said edges prior to the alignment of said edges to said first laser source.

5. A method for edge welding two metal plates, said method comprising:
   - providing first and second laser sources;
   - moving said plates relative to said laser sources such that locations on the edges thereof pass first in proximity to the first laser source and secondly in proximity to the second laser source;
   - directing a laser beam from the first laser source through a rotating lens toward the edges of said plates to substantially eliminate discontinuities on said edges; and
   - directing a laser beam from the second laser source at the substantially discontinuity free edges produced by said first laser source to fuse said edges.

6. A method as in claim 5 further comprising the steps of:
   - providing at least one pair of spaced apart rotating alignment means disposed in rolling contact with the respective edges and in proximity to at least the first laser source for guiding said edges into the laser beam of at least the first laser source; and
   - moving said edges between said alignment means, whereby said alignment means assures proper alignment of said edges to the laser beam of said first laser source.

7. A method as in claim 6 wherein the pair of spaced apart rotating alignment means are substantially in line with the laser beam of said first laser source.

8. A method as in claim 6 wherein said at least one pair of rotating alignment means comprises a first pair and a second pair, said first pair of alignment means being substantially in line with the laser beam of said first laser source and said second pair being substantially in line with the laser beam of the second laser source.

* * * * *